Patented Feb. 14, 1928.

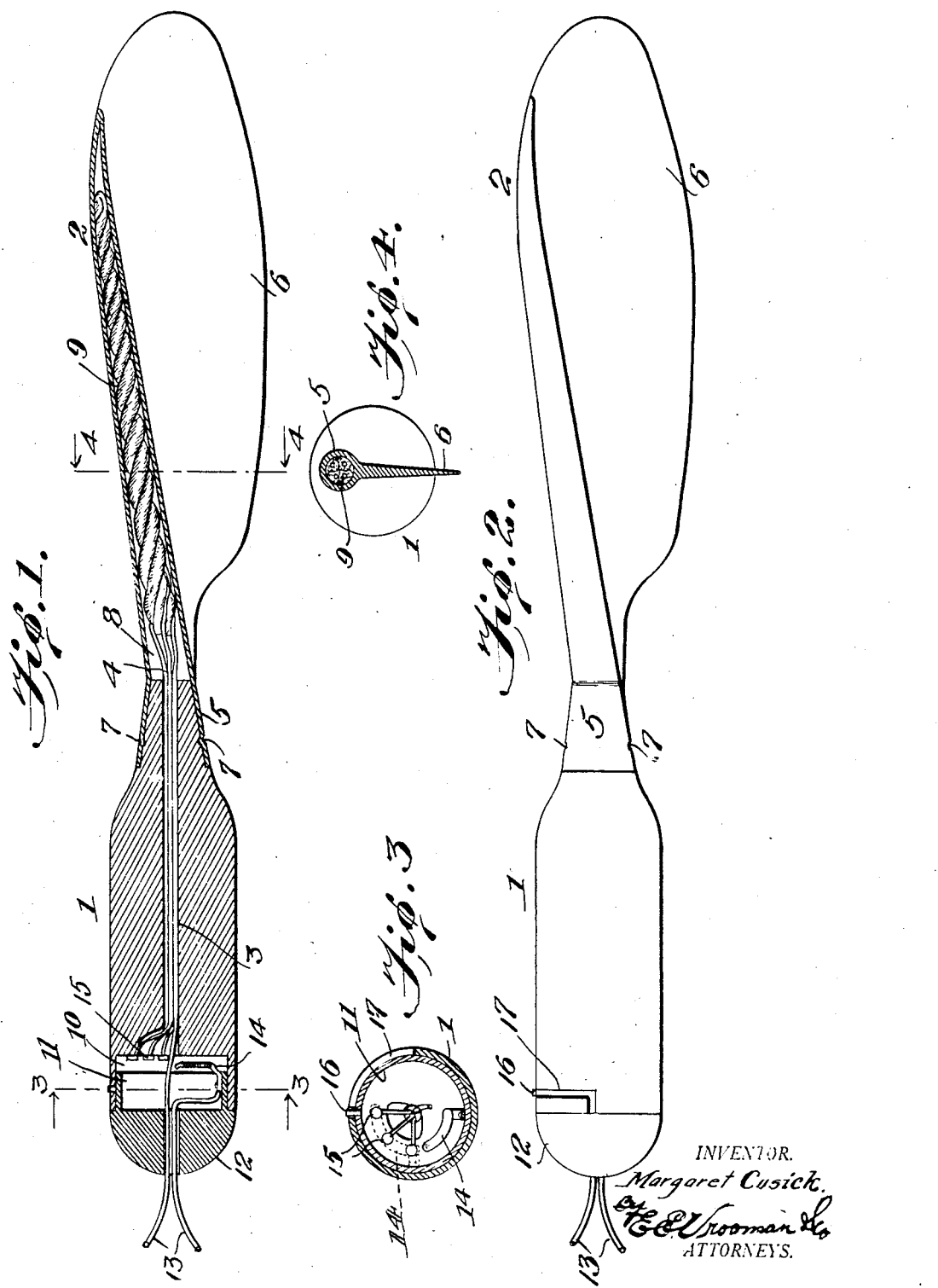

1,658,884

UNITED STATES PATENT OFFICE.

MARGARET CUSICK, OF COTTON, MINNESOTA.

ELECTRIC KNIFE.

Application filed February 7, 1927. Serial No. 166,454.

This invention relates to an electric knife.

The object of the invention is the construction of an electric knife, which can be used most efficiently for cutting warm or hot bread, which if cut by a cold knife will be made heavy. Further, pies covered with meringue are so often torn and mussed by using a cold knife, whereas if my electric knife is used, it will cut through the meringue and leave the cut smooth. My knife also cuts efficiently cake that so often sticks to a cold knife and makes a ragged cut. This knife is especially adapted for spreading icing on cake, and will spread butter very satisfactorily upon toast, as the butter will be melted as it is spread upon the toast.

With the foregoing and other objects in view, my invention comprises certain novel constructions, combinations and arrangements of parts as will be hereinafter fully described, illustrated in the accompanying drawings, and more particularly pointed out in the appended claim.

In the drawings:

Figure 1 is a longitudinal vertical sectional view of a knife constructed in accordance with the present invention while Figure 2 is a view in side elevation of the same.

Figure 3 is a sectional view taken on line 3—3, Figure 1, and looking in the direction of the arrows.

Figure 4 is a sectional view taken on line 4—4, Figure 1, and looking in the direction of the arrows.

Referring to the drawings by numerals, 1 designates the handle and 2 is the blade of the knife. The handle 1 is provided with a longitudinally extending passage 3, through which the electric wires 4 extend. The blade 2 comprises a cone portion 5 and a cutting portion 6. The "base" or inner end of the cone portion 5 fits upon the inner end of handle 1, and this cone portion is crimped, or pressed in, as at 7—7, whereby the blade is securely retained upon the handle. It will be seen upon referring to Figure 1 that the inner end of the handle 1 is cone shape, whereby it fits snugly in the "base" or inner end of the cone portion 5, with central passage 3 opening at its inner end upon the compartment 8 which contains the heating means 9. This heating means is comprised by the wires 4 being suitably covered, and said heating means heats the blade as desired by the operator.

The outer end of handle 1 is provided with a compartment 10, in which is rotatably mounted the ring 11 of end 12. The end 12 is provided with an aperture registering with passage 3, through which wires 13 extend, one of which wires has end 14 to engage the contacts 15 so that as the end 12 is rotated, one or more of the contacts 15 will be engaged, so as to vary the heating power of the heating means in compartment 8. A pin 16 is secured to ring 11, and this pin works in L-shaped slot 17, whereby the end 12 is detachably mounted upon the handle 1 and at the same time allows the turning of the ring 11 so as to bring one or all of the contacts 15 into contact with the end 14 of wire 13.

The cutting portion 6 of blade 2 is integral with the cone portion 5, but as the cone portion 5 terminates short of the outer end of the cutting portion 6, this outer end is left free so that the knife is more efficient in that its outer end is thin and able to be easily placed under food or run through food, such as candy, for cutting the same in an efficient manner. Another advantage of the peculiar cone portion is in its excellent fitting upon the inner end of handle 1, with a free and protected outlet, for the electric wires, right into compartment 8, which structure leaves the greater portion of the blade unobstructed and free for efficiently cutting the foods. The novel conical formation of the heating means containing portion of the blade provides a most efficient receptacle or container for the heating means, because the most unimportant part of the blade may thereby be utilized for the electrical wiring, whereas the greater part of the cutting body of the blade as well as the outer end is unobstructed, yet heated efficiently for maximum results.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

As a new article of manufacture, an electric knife comprising a handle provided with an inner conical end, said handle and conical end having a central longitudinally extending passage, a blade provided with a cutting portion and with an elongated cone portion extending longitudinally thereof at one edge, said cone portion terminating short of the outer end of the cutting portion leaving the outer end of said cutting portion free, said entire outer end provided with a curved cutting edge adapted to be placed under food or run through candy for marking the same, said cutting portion converging at its inner end and extending along the cone portion near its inner end and thereby bracing the same, said inner end of the cone portion of the blade on said conical end of the handle with said central passage opening centrally of said cone portion of the blade, and electric heating means extending through said passage and cone portion of the blade, substantially as shown and described.

In testimony whereof I hereunto affix my signature.

MARGARET CUSICK.